March 11, 1924.
H. WILHELM
PRIMARY BATTERY
Filed March 22, 1920
1,486,172
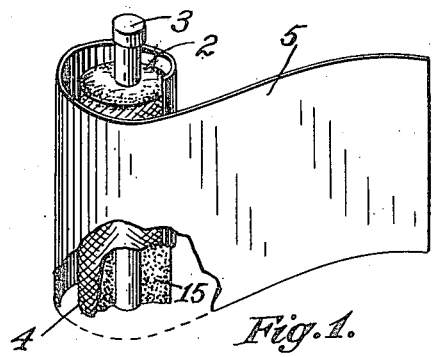
Fig.1.
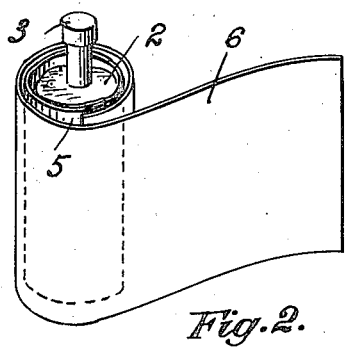
Fig.2.
Fig.3.
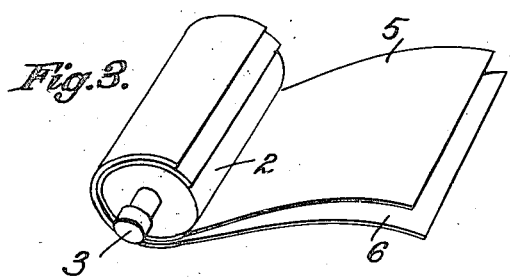
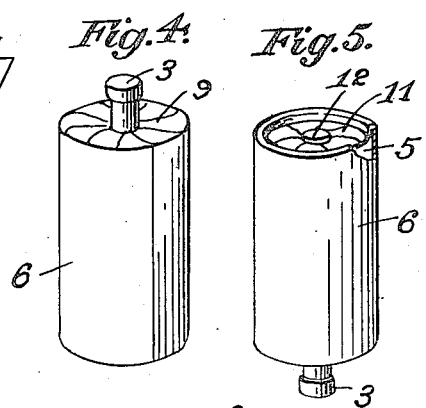
Fig.4. Fig.5.
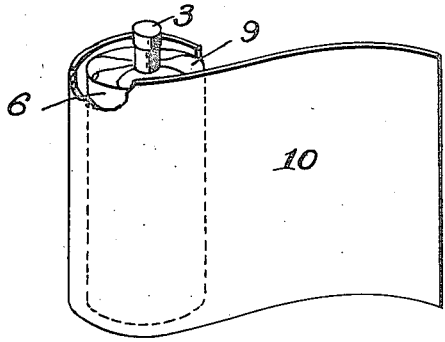
Fig.6.
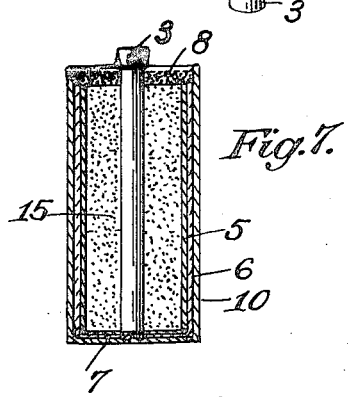
Fig.7.
Inventor
Henry Wilhelm
By his Attorneys Patented Mar. 11, 1924.

1,486,172

UNITED STATES PATENT OFFICE.

HENRY WILHELM, OF BROOKLYN, NEW YORK.

PRIMARY BATTERY.

Application filed March 22, 1920. Serial No. 367,692.

*To all whom it may concern:*

Be it known that I, HENRY WILHELM, a citizen of the United States, residing at Brooklyn, in the county of Kings and State of New York, have invented certain new and useful Improvements in Primary Batteries, of which the following is a specification.

This invention relates to the manufacture of primary or so-called dry batteries, the object thereof being to provide an improved battery and process of making the same whereby the use of a separate and independently formed zinc cup, as heretofore, is eliminated. Heretofore in the making of primary or dry batteries, it has been necessary to make a separate and independently formed zinc cup for the reception of the cartridge comprising the carbon and the depolarizing material and the other battery elements, and these zinc cups necessarily had to be made prior to the making of the cartridge in order to have them ready to receive the cartridge, and therefore had to be made of sufficient rigidity and strength to permit, in certain instances, the depolarizing material to be rammed around the carbon.

In order to ram the black mix, as it is usually called, into the cup, this of course had to be made of sufficient strength and rigidity to permit this to be done, and this cup was made up with a bottom, which either had to be soldered to the cylinder forming the cup or else the cup had to be drawn out, an expensive procedure in either event, as the cup had to be of considerable thickness so that the cost of the material alone was considerable. Not only this, but if the cup were made by soldering the longitudinal or side seam of the cylinder instead of drawing the cup out, the bottom also had to be soldered thereto, this being usually the preferable mode heretofore adopted of making the cup. The cost of stamping the bottoms and of the labor in soldering the cylinder and the bottom thereto together with the cost of the soldering iron, solder and the gas necessarily used for this purpose together with the thickness of zinc which had to be used has made the cost of dry batteries very high, exclusive of the filling material and the operation of filling.

In Patent No. 894,866 dated August 4, 1908 to G. M. Wheeler and myself, I improved upon this method of making the cups by rolling a sheet of zinc to form the cup together with a suitable porous paper, etc., and by this means I was able to do away with the expense of soldering and the soldering material, and able to use a thinner piece of zinc, but nevertheless the cup used had to be made first and of sufficient thickness to permit the black mix to be rammed therein.

The object of the present improvement is to entirely do away with the use of a separate and distinct zinc cup, which was expensive to form and make, and yet provide a battery equally as effective, if not more so, than batteries of the same kind heretofore made.

Other objects of this invention will appear as the description proceeds, reference being had to the accompanying drawing forming part of this specification, wherein like reference characters indicate corresponding parts in the several figures and wherein Fig. 1 is a perspective view illustrating the application of an electrolyte material to the cartridge; Fig. 2 is a perspective view illustrating the application of a zinc sheet thereto; Fig. 3 is a perspective view illustrating the application of both electrolyte material and zinc sheet to the cartridge; Fig. 4 is a view illustrating the battery thus formed; Fig. 5 is a view partly broken away showing the bottom thereof; Fig. 6 is a view of the structure shown in Fig. 4, parts being broken away, and illustrating the application of a wrapping material thereto; and Fig. 7 is a vertical sectional view of one form of a completed battery.

The present improvement is adapted for use in various kinds of so-called dry batteries, such as flash light batteries, using one, two or three or more cartridges or with larger batteries where only one cartridge is used. In the former case it is not necessary to solder a binding post to the upper edge of the zinc wrapper, while in the latter case a binding post may be readily soldered to the zinc wrapper. Otherwise, the formation of the cartridges is the same, except that where a plurality of cartridges are used in the same case or container, as in a flash light battery, the outer wrapper is folded at the bottom of each superposed battery so as not to completely cover the same and thereby permit contact of the several superposed batteries through the central carbon.

One of the advantages in making a battery by the present improved method is that every element can be readily and separately handled, and further when the zinc foil is wrapped around the battery elements the battery is practically complete.

In the manufacture of this improved battery, the cartridge 2 is made by taking an electrode or carbon stick 3 and locating around it a suitable depolarizing mixture 15 to make a cartridge. This may be done by locating the carbon stick in a suitable mould and ramming the depolarizing or black mixture or mass around the carbon in the usual manner until it is sufficiently compact to retain its shape and form thereby to permit it to be handled.

In some instances the cartridge 2 may be wrapped by a suitable porous material, or cheese-cloth 4 for the purpose of protecting it and holding the particles of the black mix together. Around this cartridge is then located a suitable electrolyte material which may be in the form of a paste by inserting the cartridge into a jelly paste in the manner shown and described in my contemporaneously pending application Serial No. 269,152, filed December 31, 1919, or in place thereof it may be found practicable to spread this paste upon the sheet of zinc foil hereinafter referred to and wrap the two together, or in place of the paste a suitable bibulous or porous material 5, such as blotting paper, cloth or any other material suitable for the purpose having been suitably saturated with an electrolyte solution may then be wrapped around the cartridge, and which may be tucked in at the top and bottom if preferred, but of course not over the carbon stick at the top. Around the battery elements thus formed is wrapped or rolled a sheet of zinc foil 6, which foil may be wrapped one or more times and in some instances will be tucked or folded in at the bottom of the cartridge and while this zinc foil is particularly well adapted for a battery or cell of small size, it can also be readily used around a larger cell by rolling it a plurality of times therearound. By the present method of making batteries the sheet of zinc foil 6 may be readily used and can be a comparatively thin sheet of foil because it does not have to resist any ramming as in the making of the ordinary battery, and therefore less zinc can be used and a very much less expensive battery made, which however, will be equally if not more efficient than batteries heretofore made. When a binding post terminal is used with a battery or cell, this may be readily and easily soldered to the upper edge of the zinc wrapper.

The bottom and top of the battery may then be completed either by pitching it or if preferred by tucking in the electrolyte material when this is in the form of a porous or bibulous material, and by tucking in the sheet of zinc foil if preferred as shown at 9 in Figs. 4 and 6, this being the easiest way in the manufacture of small batteries while in the manufacture of large batteries or cells it is usually preferable to pitch the top and bottom of the battery, although if preferred suitable washers may be used in place of the tucking in. For the purposes of illustration the electrolyte material 5 and the zinc foil 6 are shown in Fig. 7, as at 7, tucked in at the bottom, and the top is shown pitched as at 8.

Around the zinc foil a suitable jacket or wrapper 10 is then rolled and tucked in at the bottom and left open at the top in the same manner that the zinc foil in Fig. 7 is left open at the top. This jacket or wrapper may be insulated by any suitable material, such as paraffin or tar, as may be found most desirable in practice. The use of this insulating wrapper is not absolutely necessary, but it strengthens the battery in that it prevents any possible leakage through the lapping portions of the zinc sheet wrapper and also makes the battery weather-proof.

It will be observed from the foregoing, that a complete battery is provided without the use of a separate and complete cup previously formed while at the same time the several battery elements can be separately handled during the manufacture of the cup, and furthermore a considerable saving in time and labor as well as in the quality of the zinc necessary is the result, and that when the sheet of zinc foil and the wrapper are folded around the battery elements, the battery is practically complete.

In the manufacture of large batteries, the outside paper wrapper may be tucked in completely at the bottom because there is no necessity of contact at the bottom. But in the manufacture of small batteries, such as for flash lights, where several cartridges are used, one on top of another, as it is necessary that there be contact through the several central electrodes 3 from one to the other, the outside jacket or wrapper of insulated paper would either not be tucked in at all or so tucked in as to leave the end 12 (Fig. 5) of the central electrode 3 exposed, so that it can properly contact with an exposed portion of a central electrode 3 of a companion cartridge when several of these cartridges are used in the flash light battery.

In practice the sheet of zinc foil may have the overlapping edges thereof secured in any desired way, as by soldering or by adhesive tape or in any other way found desirable in practice, although as a matter of fact when the outside wrapper is rolled around the rolled zinc and suitably secured, this will usually be sufficient to hold the overlapping portions of the zinc wrapper in place.

In some cases I may insulate the zinc foil before putting on the outer jacket by using paraffin or other insulating material, which would partially assist in maintaining the overlapping portions of the zinc foil together and then the completed battery may be wrapped in its paper jacket by rolling the same thereon as hereinbefore explained, but in other instances where I use a suitable insulated paper jacket, the paraffin or other insulating material around the zinc foil may be omitted.

It will be understood of course that the paper jacket or wrapper may be pasted along its edges to keep it in place, which of course would hold the zinc wrapper in place, but in practice the label which is usually used on the jacket when placed around the same will hold, not only the jacket, but the zinc wrapper in place.

The various details may be more or less changed without departing from the spirit or scope of the present improvement as defined in the appended claims.

I claim as my invention:

1. A primary battery comprising a cartridge, an electrolyte material, and a sheet of zinc foil rolled around such cartridge.

2. A primary battery comprising a cartridge, an electrolyte material, and a sheet of zinc foil rolled around such cartridge and tucked in.

3. A primary battery comprising a cartridge, an electrolyte material, and a sheet of zinc foil rolled separately or together with said electrolyte material around said cartridge and tucked in.

Signed at #23 Hale Ave. in the county of Kings, city and State of New York, this 17th day of March, 1920.

HENRY WILHELM.